United States Patent [19]

Bose

[11] 4,139,441
[45] Feb. 13, 1979

[54] ELECTROFILTRATION WITH BI-DIRECTIONAL POTENTIAL PRETREATMENT

[75] Inventor: Phillip R. Bose, Pleasant Hill, Calif.

[73] Assignee: Chevron Research Company, San Francisco, Calif.

[21] Appl. No.: 876,590

[22] Filed: Feb. 10, 1978

[51] Int. Cl.² .............................................. B03C 5/00
[52] U.S. Cl. ..................................... 204/191; 204/305
[58] Field of Search .............................. 204/186–191, 204/305

[56] References Cited

U.S. PATENT DOCUMENTS

| | | | |
|---|---|---|---|
| 2,534,907 | 12/1950 | Ham et al. | 204/188 |
| 2,894,895 | 7/1959 | Turner | 204/302 |
| 2,897,251 | 7/1959 | Waterman | 204/305 |
| 3,324,026 | 6/1967 | Waterman et al. | 204/302 |
| 3,394,067 | 7/1968 | Shirley | 204/180 |
| 3,577,336 | 5/1971 | Shirley | 204/188 |
| 3,799,855 | 3/1974 | Franse | 204/188 |
| 3,799,857 | 3/1974 | Franse | 204/188 |
| 3,847,775 | 11/1974 | Prestridge | 204/191 |
| 3,928,158 | 12/1975 | Fritsche | 204/188 |
| 4,049,535 | 9/1977 | Winslow, Jr. | 204/305 |
| 4,054,501 | 10/1977 | Nikitin et al. | 204/186 |
| 4,056,451 | 11/1977 | Hodgson | 204/305 |

FOREIGN PATENT DOCUMENTS 1008130  10/1965  United Kingdom ..................... 204/186

Primary Examiner—T. M. Tufariello
Attorney, Agent, or Firm—D. A. Newell; R. H. Davies; W. D. Reese

[57] ABSTRACT

Electrofiltration, in which solids are removed from a liquid by adherence to surfaces of bodies maintained in an electrostatic field when the liquid is passed through the field, is improved by subjecting the liquid to pretreatment with an electrostatic field of oscillating intensity, especially a field of oscillating alternating polarity.

11 Claims, 1 Drawing Figure

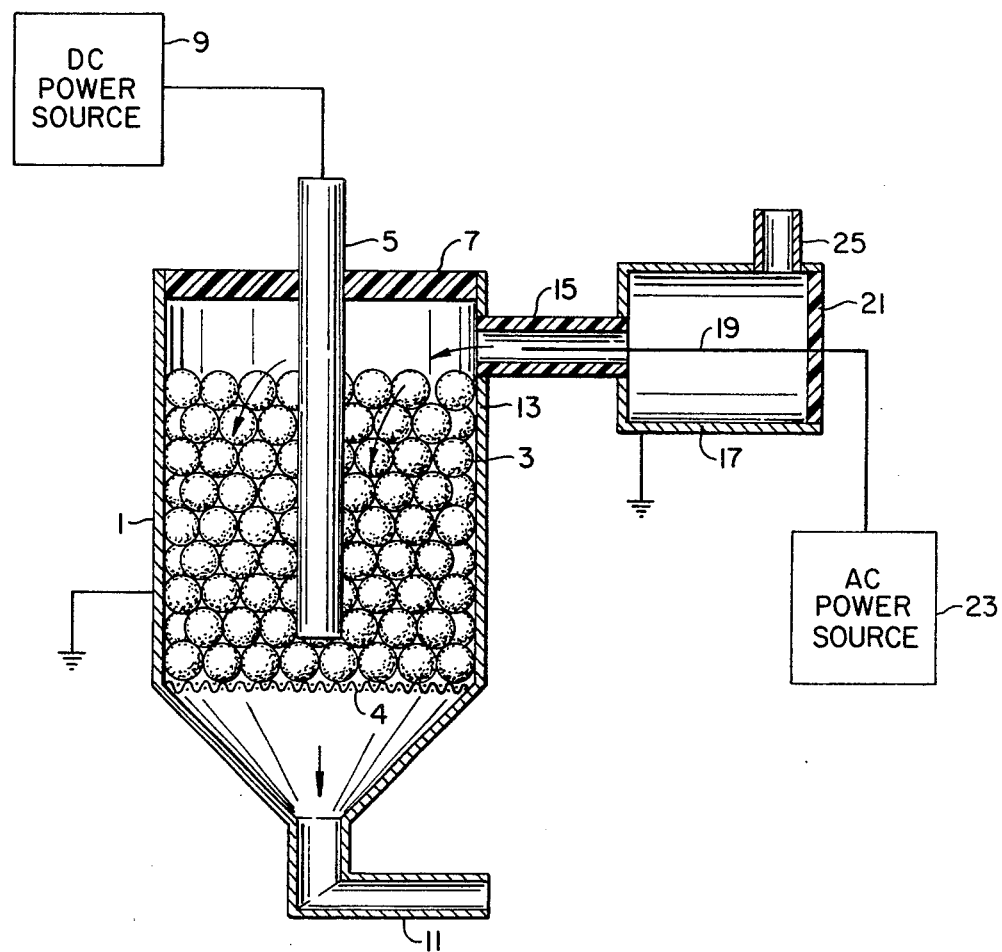
FIG.—1.

ELECTROFILTRATION WITH BI-DIRECTIONAL POTENTIAL PRETREATMENT

BACKGROUND OF THE INVENTION

The present invention pertains to the field of electrostatic separation of solids from liquids.

The use of electrostatic separation to remove solids from non-conductive liquids and gases is well known. Generally, a high voltage potential of substantially unvarying intensity is maintained between two electrodes, and the fluid is passed between the electrodes. Finely divided solids present in the fluid will adhere to the electrodes or to the surfaces of dielectric solids such as packing materials between the electrodes.

Electrostatic precipitators are often used for removing dust from gases of low conductivity, such as flue gas or gaseous effluents from cement or gypsum calcination operations. Single-stage precipitation systems, commonly known as "Cotrell precipitators," are used for dust or mist collection in treating various industrial process gases. The collecting electrodes used may be parallel plates, screens, etc., or may be pipes, with the discharge electrodes being placed between the plates or within the pipes. Electrical precipitators are generally energized by rectified alternating voltage of commercial frequency. The voltage is stepped up to the required value and then rectified. Chemical Engineers' Handbook, 4th Edition (1963), edited by John H. Perry, includes a discussion of electrostatic separation of solids from gases in Section 20, pages 82–91.

Electrofilters are used for removing small concentrations of finely divided solids from liquids of low conductivity, such as hydrocarbons. Generally, a high DC potential of substantially unvarying intensity is maintained across a bed of nonconductive (di-electric) solid packing, such as urethane foam or glass beads. The liquid feed is passed through the bed, across which the DC potential is maintained, and the finely divided solids in the feed adhere to the non-conductive solids in the bed, so that the liquid withdrawn from the bed is relatively pure.

U.S. Pat. No. 3,928,158 describes removal of electrically conductive solids from oil by passing the oil through a bed of high resistivity, spherical, ceramic beads. A unidirectional electrostatic field is maintained across the bed. The oil to be filtered must be substantially water-free. The system can be used to remove iron sulfide from petroleum residuum. Similar systems are shown in U.S. Pat. No. 3,799,855, U.S. Pat. No. 3,799,856, and U.S. Pat. No. 3,799,857. A bed formed of sintered glass particles is described in British Pat. No. 1,008,130, for use in an electrofiltration operation. The Oil and Gas Journal, Mar. 28, 1977, page 73, describes removal of fluid catalyst cracking fines from decanted processed oil using an electrofilter of the type shown in U.S. Pat. No. 3,928,158. U.S. Pat. No. 3,324,026 discloses the use of electrofiltration for purifying jet fuel and lubricating oils by removal of such solids as siliceous materials, metallic materials, rust, carbon, organic filaments, etc. U.S. Pat. No. 2,573,967 describes an electrofilter system which employs a bed packed with glass wool. The complete disclosures of the above-noted patents and publications are incorporated herein by specific reference.

SUMMARY OF THE INVENTION

In an embodiment, the present invention relates to an improvement in methods for separating subdivided solids from a liquid having a low electrical conductivity, wherein a mixture of the liquid and solids is passed through a separation zone, the mixture is subjected to an electrostatic field of unidirectional polarity in the separation zone so that solids adhere to a surface of at least one body in a separation zone, and the liquid is recovered from the separation zone, the present improvement comprising subjecting the mixture of the liquid and subdivided solids to at least one electrostatic field of oscillating intensity, such as oscillating alternating bidirectional polarity, prior to subjecting the mixture to the electrostatic field in the separation zone.

I have found that a direct-current-type liquid electrofiltration system is surprisingly enhanced by subjecting the feed, prior to the filtration operation, to an electrostatic field of rapidly oscillating intensity, such as produced by a source of electric potential having oscillating alternating polarity or produced by half-wave rectification of an alternating-polarity electric potential source. Oscillating intensity electrical field pretreatment substantially increases the efficiency of solids removal by electrofiltration of such materials as coal oils and shale oils, lubricating oils, liquid catalytic cracking processed stocks, etc.

BRIEF DESCRIPTION OF THE DRAWING

The attached drawing is a schematic sectional view of apparatus suitable for performing a preferred embodiment of the process of the invention.

Referring to the drawing, there is shown a large diameter electrofilter vessel 1, containing a bed of spherical glass beads 3. A discharge electrode 5 is positioned to extend centrally downwardly through the vessel 1 and the bed of beads 3 and to extend upwardly through an insulating top wall 7 of the vessel. The electrode 5 is electrically connected to a coventional DC power source 9. During normal operation of the system shown, liquid is passed downwardly through the bed of beads 3 and is removed from a vessel through an outlet 11. Attached to the upper side wall 13 of the vessel 1 is an insulating conduit 15, communicating to the vessel 1 from a smaller vessel 17. A thin AC discharge electrode 19 is positioned to extend centrally through the vessel 17 and the conduit 15, and to extend outwardly through an insulated sidewall 21 of the vessel 17. The electrode 19 is electrically connected to a conventional AC potential source 23. In normal use of the system, liquid feed is introduced into the vessel 17 through an inlet 25.

DETAILED DESCRIPTION OF THE INVENTION

The improved process of the present invention can be employed in electrofiltration using any one of a variety of known systems for separating finely divided solids from low conductivity liquids. In general, the present improvement is used in systems for separating solids from the same liquids as are treated in known electrofilters. In a preferred embodiment, the present invention is used for removing finely divided solids from hydrocarbonaceous liquids. Preferred hydrocarbonaceous feeds include: "decant oil" (the bottoms fraction resulting from fractionating the hydrocarbon effluent from a fluid catalytic cracking operation) contaminated with catalyst fines; high-boiling fractions such as lube oil fractions which are contaminated with finely divided solids such as wax crystals; coal, oil shale and tar sand oils contaminated with, e.g., inorganic solid materials; used lubricating oils contaminated with various finely divided solids; jet fuels contaminated with, for example, catalyst fines; etc. Other feeds which are suitable are hydrocarbon or hydrocarbonaceous mixtures from which a desired hydrocarbonaceous solid (e.g., crystalline) material is to be recovered. For example, crystallization and centrifugation are conventionally used for recovering paraxylene from admixture with metaxylene and other $C_8$ alkylaromatic isomers. The process of the present invention may be used for recovering a concentrating the solid crystalline paraxylene.

The direct current-type separators which can be used in the electrofiltration step in the process of the present invention are those known in the art. Normally, a low-conductivity liquid is passed into a separation zone such as a vessel or chamber and is passed between a discharge, or emitting-type electrode and a collecting, or grounded electrode. An electrostatic field of unidirectional polarity and typically substantially static intensity is maintained substantially continuously between the electrodes. Subdivided solids in the liquid passing between the electrodes adhere to at least one solid body in the separation zone, such an electrode surface or the surface of some other solid body provided in the separation zone. Typically, an extended surface area is provided by the use of substantially non-conductive bodies such as packing materials. In a preferred embodiment of the invention, it is preferred that the separation zone include substantially non-conductive, subdivided packing material, particularly preferably spherical solid bodies such as glass beads. The unidirectional electrostatic field used in the separation zone may be of any type known to be effective by those skilled in the art and may be provided by any suitable and convenient means. The particular source of and type of the static intensity electrostatic field and the particular type of electrodes employed may be the same as are known to be suitable for use with the particular separation zone, as well as with the liquid to be treated, the type of solid to be removed, the type of packing material in the separation zone, and other like considerations which will be apparent to those skilled in the art. In cases where the solids to be separated from a liquid have any substantial degree of conductivity, as is often the case with inorganic material, it is preferred to shield all the electrodes from direct contact with the liquid being treated, using a dielectric material such as glass.

According to the present invention, the mixture of liquid and solids to be treated is subjected to a pretreatment in at least one electrostatic field of oscillating intensity, e.g., a field of alternating bidirectional polarity, or a field produced by use of electrical potential from half-wave rectification of conventional alternating bidirectional polarity, prior to carrying out the electrofication step with the normally substantially static intensity, direct-current-type electrostatic field. Preferably the oscillating intensity treatment includes use of an electrostatic field of oscillating, alternating polarity, such as is produced using potential generated by commercial alternating-current power sources. Discharge and/or collecting electrodes used in the oscillating intensity pretreatment may be of any convenient shape or type, such as screens, plates, etc. Conveniently, the discharge electrode can be centrally positioned within a conduit or chamber, the walls of which act as the collection electrode. As in the case of the electrofiltration equipment, use of a dielectric shield to prevent direct contact between the electrodes and the liquid and solids being treated in the oscillating intensity electrical potential pretreatment step may be advantageous when the solids to be filtered are conductive to any substantial degree.

The maximum peak emitting electrode voltage applied in the oscillating intensity potential pretreatment step (assuming the collecting electrode is grounded) should usually be about 500 volts or higher, and more preferably, at least 1000 volts. In general, higher peak voltages are preferred, such as peak voltages above about 5000 volts, with 16,000 volts, 60,000 volts and 100,000 volts considered as quite suitable for use in the present invention. Advantageously, the maximum peak potential of the oscillating field can be just below the point of dielectric breakdown in the particular liquid to be filtered, which will depend on the feed composition and the dryness of the feed. High-voltage alternating-polarity potential or half-wave rectified potential sources are commercially available via, e.g., ordinary commercial power supplies and transformers and rectifiers. The intensity of the potential forming the electrostatic field in the pretreatment step should be oscillated with a frequency of at least 30 to 40 hertz. Of course, for alternating bipolar potential systems, 60 hertz oscillation is normally the easiest type of power to obtain commercially, and oscillation at 60 hertz is considered particularly suitable for use in the present invention. Higher frequencies are also considered quite suitable, e.g., 120 hertz, 240 hertz, 1000 hertz, etc. The period of time for which the liquid-solids mixture is subjected to the AC-type or half-wave-type oscillating intensity pretreatment does not appear to be particularly critical in obtaining the beneficial results of the invention. Contact times of the feed with the oscillating intensity electrostatic field of 0.01 second or more are considered quite satisfactory.

PREFERRED EMBODIMENT OF THE INVENTION

In a preferred embodiment of the invention, a system like that shown in the drawing is employed. A bottoms fraction formed by fractionation of cracked FCC product (decant oil) containing 0.37 weight percent solids, e.g., FCC catalyst fines, is introduced through the conduit 25 into the chamber 17. The discharge electrode 19 is energized from the AC power source 23 at a maximum peak voltage of 16,000 volts, which alternates polarity at a frequency of oscillation of 60 hertz. The chamber 17 is grounded to provide a suitable collection electrode for the alternating potential, oscillating field pretreatment. The pretreated decant oil then flows from the chamber 17 through the insulated conduit 15 into the liquid-solids separation zone in the relatively large conventional electrofiltration chamber 1. The discharge electrode 5 in the separation zone is energized by the substantially static intensity DC power source 9 at a substantially constant voltage of 8.3 kilovolts/inch to provide a unidirectional electrostatic field in the vessel 1. The wall of the vessel 1 is grounded to provide a collecting electrode. When the decant oil passes through the bed of glass beads 3 while being subjected to the unvarying-intensity, unidirectional electrostatic field in the vessel 1, the solid catalyst fines in the decant oil adhere to the glass beads. The resulting purified decant oil passes downwardly through the perforated plate 4 and is recovered from the system through the outlet 11. It may be desirable to clean the beads 3 periodically, as by backflowing oil or some other liquid upwardly through the bead to agitate the beads and remove accumulated solids, so that the solids can be discarded.

The following examples illustrate the operation of the present invention and its use with various feeds. The examples also illustrate the advantages of operation according to the present invention, as opposed to various other types of pretreatment (or lack of pretreatment) with different feeds.

EXAMPLE 1

The apparatus used in the tests included an upper, pretreatment section and a lower, unidirectional polarity filtration section. The upper section was made of a vertically oriented glass tube ¾ inch in diameter and 3 inches in height. A platinum wire electrode was secured through the wall of the glass tube approximately one-half way down the tube. The wire was shaped to extend in to the centerline of the tube and then downwardly for ½ inch along the centerline of the tube for use as an oscillating intensity potential, (usually alternating polarity), discharge electrode. The other end of the platinum wire extended outward from the tube. It was connected, when appropriate, to a suitable alternating polarity power source, or to other oscillating-intensity potential power source such as a half-wave rectifier. A glass funnel was positioned at the inlet at the top end of the tube for feeding in liquid-solid mixtures to be treated. Four small-diameter glass tubes led vertically downwardly from the outlet at the bottom end of the tube as manifolds for distributing the pretreated mixture into the filtration cell after the pretreatment. The filtration cell was of basically conventional design and operation. It included a 2½ inches diameter by 32 inches high stainless-steel pipe. A Bakolite cap sat over the top, inlet end of the pipe. The four small-diameter glass manifold tubes leading from the pretreatment tube were set into the cap to secure the pretreatment section above the filtration cell. A ¼ inch diameter stainless steel rod was secured into the Bakolite cap and positioned to extend centrally downwardly through the stainless steel pipe to provide a static intensity, DC discharge electrode. The upper end of the stainless rod was extended slightly above the top of the cap and was connected to a conventional non-oscillating (DC) potential source. The stainless-steel pipe was grounded to provide a collecting electrode. Below the bottom of the rod in the pipe, a 20-mesh stainless steel screen was welded across the cross section of the pipe to act as a bed support. A 1 inch diameter by 6 inches long stainless steel outlet tube led downwardly from the lower end of the pipe for removing effluent from the pipe after filtration. The pipe contained a 27 inches high bed of ¼ inch uniformdiameter, spherical glass beads.

EXAMPLE 2

The system described in Example 1 was used to perform tests on a feed with and without an alternating polarity type, oscillating intensity electrical potential pretreatment step, in order to demonstrate the advantages of using the oscillating intensity potential pretreatment step. The feed employed was a decant oil (bottoms fraction obtained from an FCC effluent fractionator), which contained 0.22 weight percent solid fines. The flow rate of the feed was maintained at about 50 cc per second. In each run, a substantially constant unidirectional potential of 8.3 kilovolts per inch was maintained in the filtration cell. The effluent from the filter was tested to determine the residual fines content thereof. The results of the runs are shown in Table I.

TABLE I

| Run | Pretreatment AC Max. Voltage, KV | Pretreatment Oscillation Rate, Hz | Solids Removal Wt. % |
|---|---|---|---|
| 1 | None | None | 50 |
| 2 | 5 | 60 | 81 |
| 3 | 8.3 | 60 | 88 |
| 4 | 16 | 60 | 99 |
| 5 | 7 | 300 | 81 |
| 6 | 1.2 | 1000 | 86 |
| 7 | 3.6 | 1000 | 81 |

The results shown in Table I demonstrate the effectiveness of AC-type oscillating intensity potential pretreatment according to the present invention at several maximum voltages and at several rates of electrostatic potential intensity oscillation. The results also show the surprising and substantial advantage of using the oscillating potential intensity pretreatment, relative to simple electrofiltration.

EXAMPLE 3

For purposes of comparison, a unidirectional polarity pretreatment step with static, nonvarying-intensity potential was compared with an alternating polarity, oscillating intensity pretreatment step and with a pretreatment using oscillating potential obtained by a half-wave rectification of alternating bipolar potential. The same apparatus was used in the tests as is described in Example 1. The only difference was that the wire electrode used for pretreatment was connected to an appropriate direct current, static potential source during the static intensity, direct current pretreatment, rather than to the alternating polarity potential source used for the AC oscillating field intensity pretreatment in the AC test, and to an appropriate half-wave rectifier during the oscillating intensity polarity test using half-wave rectified oscillating potential. The DC potential used in the conventional electrofilter cell was 8.3 kilovolts per inch for each test. Two different feeds were tested. In one test series, the same FCC fractionator bottoms feed used in the test described in Example 1 was tested. It contained 0.22 weight percent catalyst fines. In another test series, stripper bottoms obtained by fractionating a liquid derived from a conventional H-Oil process were subjected to filtration. The stripper bottoms contain 0.34 weight percent of finely divided inorganic and organic solids. The results for each of the runs with no pretreatment, static potential pretreatment, AC pretreatment and half-wave rectified oscillating potential pretreatment are all shown in Table II.

TABLE II

| Run | Type Feed | Pretreatment Type (KV) | Solids in Effluent, Wt. % |
|---|---|---|---|
| 1 | Coal Liq. | None | 0.32 |
| 2 | " | DC (20) | 0.34 |
| 3 | " | AC (20) | 0.16 |
| 4 | FCC Bottoms | None | 0.11 |
| 5 | " | DC (20) | 0.12 |
| 6 | " | AC (20) | 0.002 |
| 7 | " | half-wave (20) | 0.05 |

The results shown in Table II demonstrate that a static intensity potential pretreatment fails to give results equivalent to the advantages provided by AC pretreatment or half-wave rectified oscillating intensity potential pretreatment of the feed according to the present invention, and that alternating polarity potential pretreatment provides a very substantial advantage over both no pretreatment and static intensity potential pretreatment.

EXAMPLE 4

The system described in Example 1 was used to filter floc wax from a lubricating oil fraction. The feed contained 0.1 weight percent floc wax organic solids. Alternating polarity potential pretreatment was performed at 60 kilovolts and 60 hertz. The effluent from the filter contained only 0.001 weight percent floc wax when the alternating polarity pretreatment was used. Without the AC pretreatment, simply using the conventional electrofilter in exactly the same manner, the effluent from the filter contained 0.07 weight percent floc wax. Oscillating intensity potential pretreatment according to the present invention substantially improved the ability of the electrofilter to filter out organic solids.

EXAMPLE 5

The system described in Example 1 was used to filter a used crankcase oil. Oscillating intensity pretreatment was performed using AC current at 16 kilovolts and 60 hertz. For purposes of comparison, each feed was tested both using AC pretreatment and without using AC pretreatment. All runs were at a rate of 2 gallons per minute. The results are shown in Table III.

TABLE III

| Test | Feed | AC Pretreated Product | Unpretreated Product |
|---|---|---|---|
| Neutral No. (mg KOH/gram) | 6.3 | 5.2 | 8.4 |
| Pentane Insolubles, wt. % | 0.95 | 0.47 | 0.53 |
| Ash, Oxide wt. % | 1.44 | 0.78 | 1.33 |
| Viscosity at 100° F (SSU) | 459 | 41 | 133 |

From the results shown in Table III, it is apparent that AC pretreatment according to the present invention is quite successful in reducing the solids content of the used crankcase oil and in clearing the appearance of the product; however, since it is desirable to maintain a high viscosity in a lubricating oil, it must be noted that the viscosity of the product was more adversely affected by AC pretreatment according to the invention than it was by the simple electrofiltration. The pretreatment step adversely affected the viscosity of the used oil as compared with its initial viscosity. This viscosity change probably results from removal of a large part of the suspended material.

What is claimed is:

1. In a method for separating subdivided solids from a liquid having a low electrical conductivity by passing a mixture of the liquid and the solids through a separation zone, subjecting the mixture to an electrostatic field of unidirectional polarity in the separation zone whereby said solids adhere to a surface of at least one solid body in the separation zone, and recovering the liquid from the separation zone, the improvement comprising: subjecting said mixture to at least one electrostatic field of oscillating intensity before subjecting said mixture to said unidirectional electrostatic field.

2. An improved method according to claim 1 wherein said field of oscillating intensity potential is provided by potential resulting from half-wave rectification of alternating polarity potential.

3. In a method for separating subdivided solids from a liquid having a low electrical conductivity by passing a mixture of the liquid and the solids through a separation zone, subjecting the mixture to an electrostatic field of unidirectional polarity in the separation zone whereby said solids adhere to a surface of at least one solid body in the separation zone, and recovering the liquid from the separation zone, the improvement comprising: subjecting said mixture to at least one electrostatic field of alternating bidirectional polarity before subjecting said mixture to said unidirectional electrostatic field.

4. An improved method according to claim 3 wherein said electrostatic field of alternating polarity has a maximum potential of at least 500 volts.

5. An improved method according to claim 3 wherein said electrostatic field of alternating polarity oscillates polarity with a frequency of about 60 hertz.

6. An improved method according to claim 3 wherein said electrostatic field of unidirectional polarity is applied to said mixture in the presence of substantially nonconductive subdivided packing material in said separation zone.

7. An improved method according to claim 4 wherein said packing material comprises substantially spherical solids.

8. An improved method according to claim 7 wherein said spherical solids are formed from glass or ceramic.

9. An improved process according to claim 3 wherein said liquid is a hydrocarbonaceous liquid.

10. An improved process according to claim 9 wherein said subdivided solids comprise catalyst fines.

11. An improved process according to claim 9 wherein said subdivided solids comprise hydrocarbonaceous solids.

* * * * *